United States Patent
Huang et al.

(10) Patent No.: US 8,082,333 B2
(45) Date of Patent: Dec. 20, 2011

(54) DHCP PROXY FOR STATIC HOST

(75) Inventors: Dehua Huang, Los Altos, CA (US);
Premkumar Jonnala, Fremont, CA (US); Nagarani Chandika, Cupertino, CA (US); Kyle Gordon Haight, San Jose, CA (US); Feng Zhu, San Jose, CA (US); Dan Mihai Florea, Saratoga, CA (US); Bimohit Bawa, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 12/267,774

(22) Filed: Nov. 10, 2008

(65) Prior Publication Data

US 2010/0121944 A1 May 13, 2010

(51) Int. Cl.
*G06F 15/177* (2006.01)
(52) U.S. Cl. .................................. 709/222; 709/220
(58) Field of Classification Search .................. 709/203, 709/223, 220, 222
See application file for complete search history.

(56) References Cited

U.S. PATENT DOCUMENTS

| | | | |
|---|---|---|---|
| 5,550,984 A | 8/1996 | Gelb | |
| 6,070,187 A | 5/2000 | Subramaniam et al. | |
| 6,108,786 A | 8/2000 | Knowlson | |
| 7,134,012 B2 | 11/2006 | Doyle et al. | |
| 7,343,485 B1 | 3/2008 | Huang et al. | |
| 7,362,760 B2 * | 4/2008 | Wang | 370/392 |
| 7,430,614 B2 * | 9/2008 | Shen et al. | 709/245 |
| 7,434,254 B1 | 10/2008 | Foschiano et al. | |
| 7,443,850 B2 * | 10/2008 | Boyd et al. | 370/389 |
| 7,533,255 B1 | 5/2009 | Dommety et al. | |
| 7,551,559 B1 | 6/2009 | Jonnala et al. | |
| 7,616,577 B2 * | 11/2009 | Burns et al. | 370/241 |
| 7,870,603 B2 | 1/2011 | Foschiano et al. | |
| 2002/0032871 A1 | 3/2002 | Malan et al. | |
| 2003/0002436 A1 | 1/2003 | Anderson et al. | |
| 2004/0064559 A1 | 4/2004 | Kupst et al. | |
| 2004/0071164 A1 | 4/2004 | Baum | |
| 2004/0258074 A1 | 12/2004 | Williams et al. | |
| 2005/0027837 A1 | 2/2005 | Roese et al. | |
| 2005/0262357 A1 * | 11/2005 | Araujo et al. | 713/182 |
| 2008/0084888 A1 * | 4/2008 | Yadav et al. | 370/395.31 |
| 2008/0095160 A1 * | 4/2008 | Yadav et al. | 370/390 |
| 2009/0222548 A1 | 9/2009 | Dommety et al. | |
| 2011/0113482 A1 | 5/2011 | Foschiano et al. | |

OTHER PUBLICATIONS

U.S. Appl. No. 10/971,523 entitled "System and Method for Filtering Network Traffic," filed Oct. 22, 2004; Inventor(s): Dehua Hwang, et al.

* cited by examiner

*Primary Examiner* — Kristie Shingles
(74) *Attorney, Agent, or Firm* — Patent Capital Group

(57) ABSTRACT

A DHCP proxy agent is provided to send on behalf of a static host a DHCP request so that an access layer security feature such as DHCP snooping/IPSG can be applied to the static host and/or in a mixed static IP and DHCP environment.

17 Claims, 2 Drawing Sheets overall logic example details of logic

DHCP PROXY FOR STATIC HOST

I. FIELD OF THE INVENTION

The present application relates generally to applying dynamic host configuration protocol (DHCP) security features to hosts with static Internet Protocol (IP) addresses.

II. BACKGROUND OF THE INVENTION

Various network protocols are used to provide networking services to devices. For example, DHCP (Dynamic Host Configuration Protocol) allows the dynamic assignment of IP (Internet Protocol) addresses to hosts. Network protocols such as DHCP are often implemented using a client-server model in which protocol clients request services from protocol servers, which in turn provide the requested services in accordance with the network protocol. For example, in DHCP, a DHCP client may request an IP address from a DHCP server. In response, the DHCP server sends a reply assigning an IP address to the requesting DHCP client. Thereafter, the DHCP client uses the assigned IP address in a manner consistent with the protocol.

DHCP provides advantages including facilitating access control and traffic restrictions on an individual DHCP host basis, in contrast to IP port security that can be used in the case of static hosts (hosts with static IP addresses), which can only restrict the number of static hosts allowed on each access port but which cannot apply any particular individualized access control policy for each individual static host.

BRIEF DESCRIPTION OF THE DRAWINGS

The details of the present invention, both as to its structure and operation, can best be understood in reference to the accompanying drawings, in which like reference numerals refer to like parts, and in which.

DESCRIPTION OF EXAMPLE EMBODIMENTS

Overview

Example Embodiments

Figure 1:
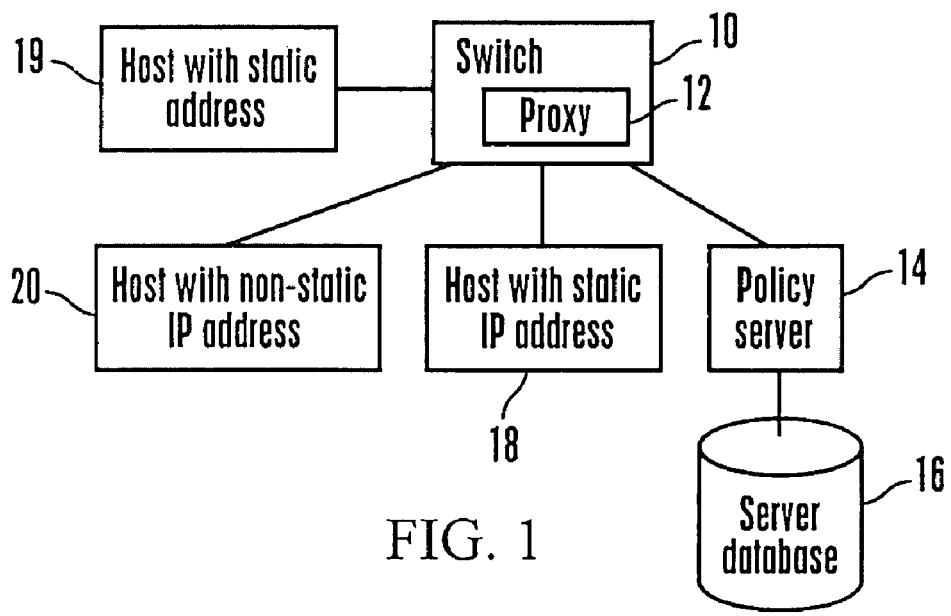
FIG. 1 is a block diagram of an example system in accordance with present principles.
Figure 2:
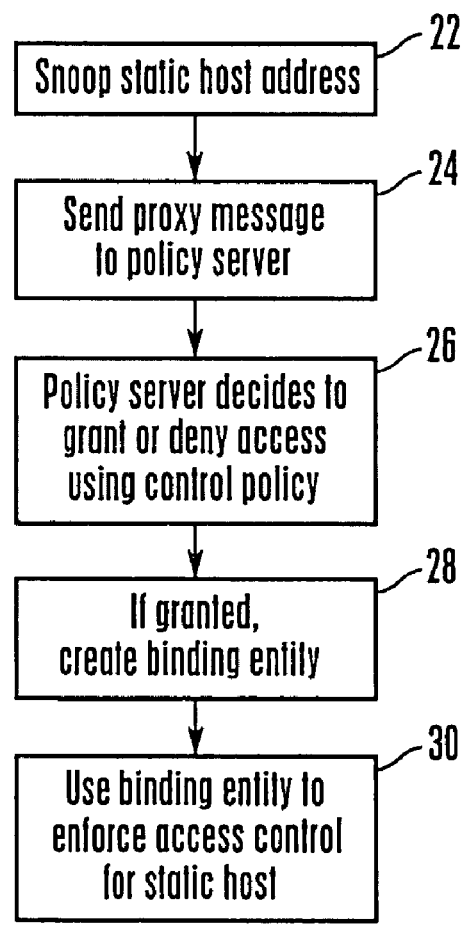
FIG. 2 is a flow chart of general example logic.

Referring initially to FIG. 1, a network switch 10 executes a proxy 12, typically stored on a tangible computer-readable medium such as disk-based storage or solid state storage, in accordance with description below to send messages to and receive messages from a policy server 14 accessing a server database 16. In an example implementation, the policy server 14 is a DHCP server. Through the switch 10, hosts 18, 19 with static addresses such as static IP addresses (hereinafter, "static hosts") can communicate with the policy server 14, as can a host 20 with dynamic address, such as a DHCP host. Additional switches, hosts, and servers may be included, it being understood that FIG. 1 is a simplified diagram for illustration only. Some embodiments may include more network devices (and network devices of different types, such as routers)

The switch 10 and policy server 14 execute the logic below. In some embodiments the proxy 12 may not necessarily be implemented on a switch but may be implemented on another device, e.g., a host device.

The switch 10 typically is configured to handle messages from other network devices and from various computing devices coupled by the network. Some messages typically are protocol messages sent to or from the policy server 14.

The example non-limiting switch 10 receives data at one of a set of input interfaces and forwards the data on to one or more of a set of output interfaces. The switch 10 can be a data-link layer device that enables multiple physical network (e.g., local area network (LAN) or wide area network (WAN)) segments to be interconnected into a single larger network. In some embodiments the switch 10 may be implemented as an open systems interconnection (OSI) layer 2 device, or a layer 3 router. The switch 10 can include logic and/or software that provides for the forwarding of messages based on the messages' destination information.

The data received and forwarded by the switch 10 is logically grouped into one or more messages. The term "message" refers to a logical grouping of information sent as a data unit over a transmission medium. Messages may include header and/or trailer information that surrounds user data contained in the data unit. A "message" may include a cell, datagram, frame, packet, segment, or any other logical group of information.

The example non-limiting switch 10 may include various interfaces to the hosts 18, 20 and to the policy server 14. These interfaces may include physical interfaces (e.g., on a line card internal to a switch) and/or logical interfaces (also referred to as virtual interfaces). For example, a physical interface such as but not limited to a trunk interface that receives messages for several Virtual Local Area Networks (VLAN) can include several logical interfaces, one for each VLAN. Alternatively, a logical interface can be an interface that is located on a physically separate intermediate network device, coupled between the switch and a group of hosts, that passes messages sent by the hosts to the switch without making forwarding decisions. Furthermore, the interfaces may be organized in various ways. For example, in some embodiments, interfaces can be organized hierarchically. In one such embodiment, physical interfaces within a switch reside at the top level of the hierarchy. A physical interface to devices in several different VLANs can include several VLAN-specific logical interfaces that are organized beneath the physical interface in the switch's interface hierarchy.

In some embodiments, the hosts 18/19, 20 and policy server 14 each include one or more of various types of computing devices with associated computer readable storage media such as solid state storage or disk-based storage. For example, the hosts 18/19, 20 and/or policy server 14 can each be a personal computer, a workstation, an Internet server, a network appliance, a handheld computing device such as a cell phone or PDA (Personal Data Assistant), or any other type of computing device. The hosts 18/19, 20 and policy server 14 can also be implemented in software processes executing on such computing devices. The hosts 18/19, 20 and policy server 14 can each be directly or indirectly connected to the switch 10 through one or more intermediate network devices such as routers (as well as one or more other switches or other network devices).

In any case, the policy server 14 provides network services to the hosts 18/19, 20 according to a network protocol. For example, in one example embodiment, the policy server 14 is configured to implement a Dynamic Host Configuration Protocol (DHCP) server. A dynamic host 20 may send a message requesting an IP address from the policy server 14 and in response to the request, the policy server 14 may send a message assigning an IP address to the requesting dynamic host 20. Present principles are not necessarily limited to DHCP.

In any case, as understood herein it may occur that environments other than pure DHCP may be implemented, i.e., static IP host or mixed static/DHCP host environments where it is required to identify a host using a source media access code (MAC)/IP address and to restrict host traffic from particular access ports. For static hosts 18/19, an IP port security feature can apply a procedure to capture a static host's traffic from an access port from monitoring traffic from the port. By way of non-limiting example, an access control list (ACL) snoop procedure can be employed to capture a static host's traffic by either snooping an address resolution protocol (ARP) or by snooping IP traffic. A MAC/IP binding entry (essentially, a badge of trustworthiness of the IP/MAC addresses of the host) is then derived to be used for access control. According to present principles, the proxy 12 can be used to further enhance IP port security as described below.

Initially the proxy 12 is running on the switch 10. At block 22, the IP traffic of a newly configured static host 18/19 is identified by, e.g., IP port security using, e.g., an ACL snooping routine. Proceeding to block 24, the proxy 12 sends a message such as a DHCP INFORM message to the policy server 14 on behalf of new static host detected at block 22. The message can include the source MAC/IP address of the static host 18/19 that was discovered through, e.g., the above-mentioned ACL snoop. In effect and as mentioned above, the policy server 14 ensures that regardless of whether the host is static or dynamic, the host's IP address/MAC address are trustworthy, so that other security features such as dynamic ARP inspection (DAI) and Internet protocol source guard (IPSG) can be applied on that host to implement access control and traffic restrictions.

Proceeding to block 26, upon receiving the message from the proxy 12, the policy server 14 server can either grant the requested IP address assignment and reflect this by sending, e.g., a DHCP ACK reply to the proxy 12, or it can deny the request and reflect this by sending, e.g., a DHCP NACK message. Further details of this process are explained below in reference to FIG. 3.

In the event that the request is granted, a binding entity is created and stored in the database 16. The binding entity may include the IP address of the static host 18/19 on whose behalf the proxy 12 sent the initial request and other protocol status information identifying the static host 18/19 with the IP address. For example, the binding entity can store the MAC address of the static host 18/19 and information identifying a subnet in which the static host 18/19 might happen to be included. Also, information can be included that indicates how messages are communicated to the static host 18/19, e.g., information identifying the identity (such as MAC address) of the switch 10, as well as which interface the switch 10 is coupled to.

Block 30 indicates that the binding entity subsequently can be used by the policy server 14 to enforce access control for the static host 18/19. This process may be repeated as each static host 18/19 is detected such that one set of access control rules may be applied to one static host 18 while another set of access control rules may be applied to a different static host 19.

Figure 3:
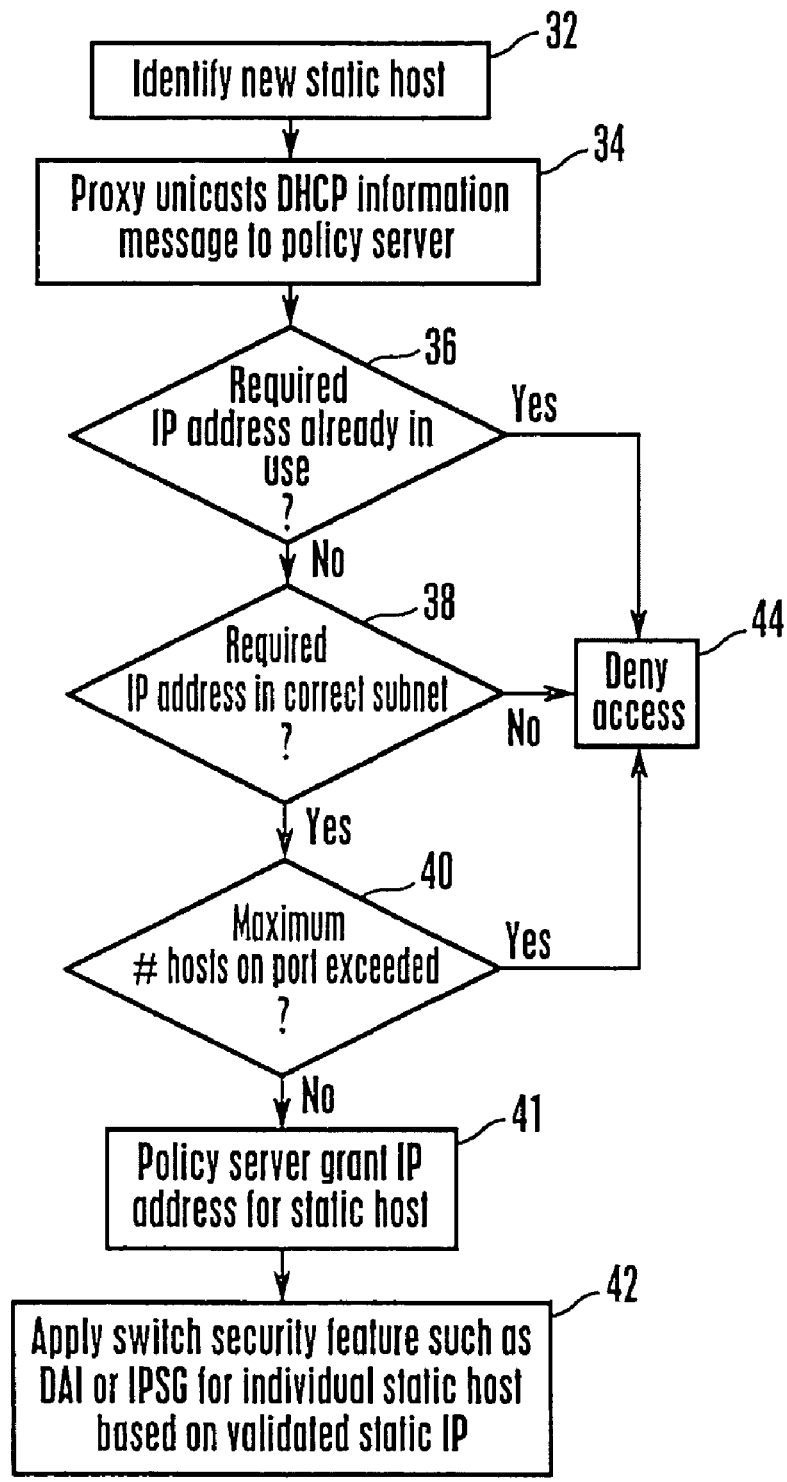
FIG. 3 is a flow chart of example detailed logic.

FIG. 3 shows additional details of the process described above. A new static host 18/19 is detected at block 32 and then the proxy 12 unicasts a message such as the above-mentioned DHCP INFORM message to the policy server 14 at block 34. In deciding whether to grant the request, the policy server 36 may determine at decision diamond 36 whether the IP address of the static host that is part of the request message from the proxy 12 is already in use. The server 14 may also determine, if desired, whether the requested IP address is in the correct subnet at decision diamond 38 and/or determine, at decision diamond 40, whether the total number of IP addresses that would be assigned to the particular access port of the switch 10 were the request to be granted would exceed a threshold defined by a maximum number of hosts that are allowed on the access port. In any case, if the IP address is not already in use by another entity and if the other tests pass, e.g., if the IP address is in the correct subnet and the maximum number of hosts on the port won't be exceeded by granting the request, the request is granted at block 41, but otherwise is denied at block 44. In any case, if granted at block 41, this means that the static host IP address is validated so that at block 42, the switch 10 can apply one or more security features such as DHCP snooping/IPSG/Dynamic ARP inspection for the individual static host 18/19 which was the subject of the request generated by the proxy 12.

In this way, the switch 10 applies security features to static hosts 18/19 in the same way it applies them to dynamic hosts 20. This gives confidence to an administrator of the network that the static IP hosts 18/19 in the network have the same individual access control as dynamic hosts 20, which reduces the risk posed by, e.g., IP spoofing in the network. Furthermore, implementing the proxy 12 leverages current infrastructure of DHCP, which includes DHCP (policy) server 14 configuration, and DHCP snooping deployment on the access layer, such that no additional special knowledge is required of the network administrator. And as stated above, present principles also enhance access control for static hosts because access control policy can be implemented individually for each static host instead of collectively imposing a single policy on all static hosts. Thus, for instance, IPSG can restrict each individual static host's traffic, on top of IP port security's restriction of the total number of such hosts on each access port.

Non-limiting example applications of above principles may be implemented for IP version 4 address hosts as well as IP version 6 hosts.

While the particular DHCP PROXY FOR STATIC HOST is herein shown and described in detail, it is to be understood that the subject matter which is encompassed by the present invention is limited only by the claims.

What is claimed is:

1. A non-transitory tangible computer readable medium storing:
    a dynamic host configuration protocol (DHCP) proxy executable by a computer to:
    send on behalf of a static Internet Protocol (IP) address host a DHCP request so that an access layer security feature can be applied to the static IP address host, wherein a static IP address for the static IP address host is identified by evaluating IP traffic associated with the static IP address host, and wherein a binding entry for the static IP address is used for access control for the static IP address host; and
    send, by the static IP address host, a message requesting an IP address from a policy server, wherein in response to the request, a message assigning the IP address is received.

2. The medium of claim 1, wherein the feature is DHCP snooping.

3. The medium of claim 1, wherein the feature is Internet protocol source guard (IPSG).

4. The medium of claim 1, wherein the proxy executes on a network switch or router.

5. The medium of claim 4, wherein the switch is a virtual switch.

6. The medium of claim 1, wherein the DHCP request is a DHCP INFORM message.

7. A computer-implemented method comprising:
receiving, at a computer, information pertaining to at least a first static IP host and a second static IP host;
implementing, using a computer, a first set of access control rules for the first static IP host and a second set of access control rules for the second static IP host, the first set being different from the second set, wherein a first static IP address and a second static IP address for the first and second static IP address hosts respectively is identified by evaluating IP traffic, and wherein a respective first and second binding entry for the first and second static IP addresses is used for access control for the first and second static IP address hosts; and
sending, by at least one of the hosts, a message requesting an IP address from a policy server, wherein in response to the request, a message assigning the IP address is received.

8. The method of claim 7, wherein the information is snooped by a proxy executing on a network switch communicating with the hosts and is sent to the policy server.

9. The method of claim 8, wherein the policy server is a DHCP server.

10. The method of claim 9, wherein the information is sent by the proxy using a DHCP INFORM message.

11. The method of claim 8, wherein the switch is a virtual switch.

12. An apparatus comprising:
at least one switch configured to communicate with at least one host having a static IP address, wherein the at least one host sends a message requesting an IP address from a policy server and in response to the request, a message assigning the IP address is received; and
at least one proxy executed by the switch and configured to convey information from the host having a static IP address to at least one dynamic host server so that access control for host having a static IP address is implemented in the same way as access control is implemented for a host having a dynamic IP address, wherein a static IP address for the static IP address host is identified by evaluating IP traffic associated with the static IP address host, and wherein a binding entry for the static IP address is used for access control for the static IP address host.

13. The apparatus of claim 12, wherein the switch is a virtual switch.

14. The apparatus of claim 12, wherein the dynamic host server is a DHCP server.

15. The apparatus of claim 14, wherein the information is conveyed to the server in a DHCP INFORM message.

16. The apparatus of claim 12, wherein a first set of access control rules is applied to a first static host and a second set of access control rules is applied to a second static host.

17. The apparatus of claim 12, wherein the information is snooped by the proxy.

* * * * *